3,792,174
FLOUR MIX FOR PREPARING TORTILLAS
Ruben G. Duarte and Manuel George Duarte, both of 1012 Nevada St., El Paso, Tex. 79902
No Drawing. Filed Mar. 10, 1971, Ser. No. 123,021
Int. Cl. A21d 2/00; A23d 1/10
U.S. Cl. 426—152                          4 Claims

ABSTRACT OF THE DISCLOSURE

A culinary mixture is provided from which tortillas may be prepared which comprises a substantial portion of wheat flour together with about 14–16 weight percent shortening, about 1–1.5 weight percent baking powder, about 1–1.5 weight percent salt, about 2–3 weight percent powdered milk, about 2–2.5 weight percent emulsifier, and about .1–.2 weight percent spoilage retarder.

---

The present invention relates to a novel culinary mixture from which bakery products can be prepared and, in particular, tortillas. More specifically, the present invention relates to a tortilla mix from which tortillas having superior taste properties can be prepared and which has superior storage capability.

Various "premixed" bakery formulations are known in the art for specifice purposes. For example, various formulations of flour, shortening, sugar, etc., are available on the market for use in preparing cakes, crusts, bread, biscuits, and other bakery products. Various formulations, however, which have been heretofore available in the prior art for preparing tortillas have not generally possessed the requisite qualities of flavor and storage life that would otherwise be desirable.

Accordingly, it is an object of the present invention to provide a mixture of flour and other ingredients from which tortillas having superior flavor can be prepared.

It is a further object of the present invention to prepare a mixture of flour and other ingredients suitable for making tortillas which has superior storage life.

Now, in accordance with the present invention, it has been found that these and other objects are obtained according to the present invention by providing the following mixture of flour and other ingredients from which tortillas may easily be prepared having satisfactory and and improved flavor qualities. According to the present invention, wheat flour is blended together with 14–16 weight percent shortening, about 1–1.5 weight percent baking powder, about 1–1.5 weight percent salt, about 2–3 weight percent powdered milk, about 2–2.5 weight percent of a suitable emulsifier, and about .1–.2 weight percent of a spoilage retarder. The above weight percents are all based upon the weight of the wheat flour employed. In addition, minor amount of suitable dough conditioners, such as calcium phosphate, can also be employed along with minor amounts of suitable vitamin enriching ingredients. Suitable emulsifiers for use in the present invention are various mono- and diglycerides, vegetable oil, and lecithin. A typical spoilage retarder which can be employed according to the present invention is calcium propionate.

The various ingredients listed above are easily blended into a dry mixture which can be packaged in suitable containers of the desired size. All that is required according to the present invention in order to prepare the tortillas for cooking is to add a suitable amount of water to produce the dough from which the tortilla is then made and cooked.

The tortilla mix of the present invention is readily distinguished from various other bakery mixes in that, for example, unlike mixes from which bread is made, no yeast or sugar are employed in the tortilla mix of the present invention. Further, in bread mixes only about 3 percent shortening is normally employed, whereas in the present invention 14–16 percent of shortening is used. Further, for example, in various mixtures for making pie crust etc., large portions of sugar and shortening are normally employed without using any baking powder. Accordingly, the tortilla mix of the present invention is uniquely different from these bakery mixes known in the prior art and permits the consumer to quickly and easily prepare delicious tortillas having the unique characteristics associated with this bakery product. Specifically, tortillas prepared using the flour mix of the present invention are easily and readily rolled into the required thin dough which can then be baked on a slightly greased griddle at about 400° F. until brown on both sides.

Example I demonstrates a typical mixture of ingredients prepared according to the present invention which resulted in a tortilla mix having superior storage qualities and from which delicious tortillas were prepared by blending the mixture with water to form a dough from which the tortillas could be easily prepared.

EXAMPLE I 100 lbs. flour
14 lbs. shortening
1 lb. baking soda
1 lb. salt
2 lbs. powdered milk
2 lbs. emulsifier
1 tablet dough conditioner
1 enrichment tablet
2 ozs. calcium propionate added to retard spoilage
When mix is ready for use, water is added.

The mixture of ingredients shown in the example were mixed with sufficient water to form a dough which could be formed into a thin pancake. The pancake was then cooked on both sides on a lightly greased griddle at a temperature of about 400° F. to give an excellent tasting tortilla.

What is claimed is:

1. A culinary mixture for preparing tortillas consisting essentially of a substantial portion of wheat flour together with about 14–16 weight percent shortening, about 1–1.5 weight percent baking powder, about 1–1.5 weight percent salt, about 2–3 weight percent powdered milk, about 2–2.5 weight percent emulsifier, selected from the group consisting of monoglycerides, diglycerides, vegetable oil, and lecithin and about .1–.2 weight percent spoilage retarder, said weight percent being based on the weight of the wheat flour.

2. The mixture of claim 1 which further includes minor amounts of dough conditioner.

3. The mixture of claim 2 wherein said dough conditioner is calcium phosphate.

4. A culinary mixture for preparing tortillas consisting essentially of a substantial portion of wheat flour together with about 14–16 weight percent shortening, about 1–1.5 weight percent baking powder, about 1–1.5 weight percent salt, about 2–3 weight percent powdered milk, about 2–2.5 weight perecnt of an emulsifier selected from the group consisting of monoglycerides, diglycerides, vegetable oil, and lecithin, about .1–.2 weight percent calcium propionate, and minor amounts of calcium phosphate, said weight percent being based on the weight of the wheat flour.

(References on following page)

References Cited

UNITED STATES PATENTS

| | | | |
|---|---|---|---|
| 2,401,259 | 5/1946 | Lloyd et al. | 99—94 |
| 3,251,695 | 5/1966 | Gidlow et al. | 99—94 |
| 3,653,915 | 4/1972 | Rubio | 99—80 R |
| 3,694,224 | 9/1972 | Rubio | 99—80 R |

OTHER REFERENCES

Woman's Day Encyclopedia of Cookery, vol. 12, 1966, pp. 1856–1857, Fawcett Publications, Inc., New York.

Zelayeta: "Elena's Secrets of Mexican Cooking," Prentice-Hall, Inc., Englewood Cliffs, N.J., 1962, pp. 117–120.

RAYMOND N. JONES, Primary Examiner